United States Patent [19]

Fruzzetti et al.

[11] Patent Number: 4,499,752

[45] Date of Patent: Feb. 19, 1985

[54] COUNTERFLOW LEAK DETECTOR WITH COLD TRAP

[75] Inventors: Paul R. Fruzzetti, N. Easton; Philip J. Leavitt, Billerica; Frank J. Nuzzi, Methuen, all of Mass.

[73] Assignee: Varian Associates, Inc., Palo Alto, Calif.

[21] Appl. No.: 506,737

[22] Filed: Jun. 22, 1983

[51] Int. Cl.³ .......................................... G01M 3/20
[52] U.S. Cl. ..................................................... 73/40.7
[58] Field of Search .................................. 73/40, 40.7

[56] References Cited

U.S. PATENT DOCUMENTS

| | | | |
|---|---|---|---|
| 2,504,530 | 4/1950 | Jacobs | 73/40.7 |
| 3,342,990 | 9/1967 | Barrington et al. | 73/40.7 |
| 3,416,359 | 12/1968 | Durbin et al. | 73/40.7 |
| 3,520,176 | 7/1970 | Becker | 73/40.7 |
| 3,626,760 | 12/1971 | Briggs et al. | 73/40.7 |
| 3,645,127 | 2/1972 | Mongodin et al. | 73/40.7 |
| 3,690,151 | 9/1972 | Briggs | 73/40.7 |
| 3,968,675 | 7/1976 | Briggs | 73/40.7 |

OTHER PUBLICATIONS

Worthington, "New Developments in Trapless Leak Detection," *Vacuum Technology Research/Development*, Nov. 1976.

*Introduction to Helium Mass Spectrometer Leak Detection*, Varian Associates, Inc., 1980, pp. 26-45.
"New Dimensions in Leak Detection," Varian Brochure, Dec. 1982.

*Primary Examiner*—Stephen A. Kreitman
*Assistant Examiner*—Hezron E. Williams
*Attorney, Agent, or Firm*—Stanley Z. Cole; William R. McClellan

[57] ABSTRACT

A counterflow helium mass spectrometer leak detector includes a test port for receiving a gas sample including the tracer gas helium, a high vacuum pump such as a diffusion pump and a mass spectrometer tuned to detect the helium. The mass spectrometer is coupled to the inlet of the high vacuum pump. The leak detector further includes a cold trap containing liquid nitrogen coupled between the test port and the foreline, or outlet port, of the high vacuum pump. The helium received at the test port passes in reverse, or counterflow, direction through the high vacuum pump to the mass spectrometer. One or more mechanical vacuum pumps insure that the pressure at the foreline of the high vacuum pump is maintained at a prescribed level during a leak test. The cold trap condenses contaminants, water vapor and other gases from the gas sample and prevents backstreaming of oil from mechanical vacuum pumps.

15 Claims, 4 Drawing Figures

COUNTERFLOW LEAK DETECTOR WITH COLD TRAP

BACKGROUND OF THE INVENTION

This invention relates to detection of leaks in sealed articles and, more particularly, to a novel helium mass spectrometer leak detector.

Helium mass spectrometer leak detection is a known leak detection technique. Helium is used as a tracer gas which passes through the smallest of leaks in a sealed test piece. The helium is then drawn into a leak detection instrument and measured. The most important component of the instrument is a mass spectrometer tube which detects and measures the helium. The input gas is ionized and mass analyzed by the spectrometer tube in order to separate the helium component which is then measured. In one approach, a test piece is pressurized with helium. A sniffer probe connected to the test port of a leak detector is moved around the exterior of the test piece. In the vicinity of a leak, helium is drawn into the probe and is measured by the leak detector. In an alternative approach, the interior of a test piece is coupled to the test port of the leak detector. Helium is sprayed onto the exterior of the test piece, is drawn inside through a leak, and is measured by the leak detector. Helium mass spectrometer leak detection provides good sensitivity, a wide dynamic range and is fast and convenient to use.

One of the requirements of the spectrometer tube is that the inlet, through which the helium and other gases are received, be maintained at a relatively low pressure, typically, $2 \times 10^{-4}$ Torr. In a so-called conventional leak detector, a roughing pump, a diffusion pump and associated forepump and a cold trap are utilized in a conventional vacuum pumping arrangement to maintain the input of the spectrometer tube at the required pressure. The conventional leak detector provides satisfactory performance under a variety of conditions. The cold trap removes water vapor and other contaminants and permits the operating pressure of the spectrometer tube to be reached. However, this configuration has certain drawbacks. The test port which is connected to the test unit or the sniffer probe must be maintained at a relatively low pressure. Thus, the vacuum pumping cycle is relatively long. Furthermore, in the testing of leaky or large volume parts, it may be difficult or impossible to achieve the required pressure level. If the required pressure level can be achieved at all, the pumping cycle is lengthy. As a result, production line testing can be costly. Backstreaming of oil from mechanical pumps into the test piece has also been a problem in conventional leak detectors.

Many of these problems were eliminated in the counterflow leak detector disclosed by Briggs in U.S. Pat. No. 3,690,151. In this leak detector, the mass spectrometer tube is connected to the inlet of a diffusion pump; and the helium tracer gas is introduced through the foreline, or normal output port, of the diffusion pump. The diffusion pump exhibits a high pressure ratio for heavier gases but a low pressure ratio for lighter gases such as helium. Therefore, helium diffuses at an acceptable rate in a reverse direction through the diffusion pump to the spectrometer tube and is measured. Heavier gases in the sample are, to a large degree, blocked by the diffusion pump and prevented from reaching the spectrometer tube. Due to the method of reverse flow in the diffusion pump, the leak detector test port can be operated at the pressure required at the diffusion pump foreline. This pressure is several orders of magnitude higher than the required operating pressure of the spectrometer tube. Performing leak tests at a higher test pressure is advantageous for several reasons. Leaky or large volume pieces can be tested, since the test pressure is relatively easy to attain. Furthermore, vacuum pumping of the test piece, regardless of its size or leak rate, is faster. It was generally thought that, due to the higher operating pressure of the counterflow leak detector as compared with the conventional leak detector, a cold trap would not be beneficial in such a system (see, for example, U.S. Pat. No. 3,690,151). The counterflow-type leak detector has provided highly satisfactory operation under a wide variety of conditions. However, it has certain limited drawbacks. In some cases, backstreaming of oil from the holding or foreline pump into the test piece has occurred. Furthermore, when it is desired to rapidly test certain large, leaky or contaminated parts, or when the humidity level has been high, the capabilities of the roughing pump to reach the required pressure level have been strained and the pumping time has been long. It is desirable to alleviate these problems without affecting the highly desirable qualities of the counterflow leak detector.

It is a general object of the present invention to provide a novel helium mass spectrometer leak detector.

It is another object of the present invention to provide a leak detection system having the features of high test pressure and high water vapor pumping capability.

It is yet another object of the present invention to provide a leak detection system wherein backstreaming of oil into the test piece is eliminated.

It is still another object of the present invention to provide a leak detection system with improved operating speed.

SUMMARY OF THE INVENTION

According to the present invention, these and other objects and advantages are achieved in apparatus for leak detection comprising a test port adapted for receiving a trace gas, a gas analysis instrument tuned to detect the trace gas and having an inlet for receiving the trace gas and a first vacuum pumping means characterized by a relatively high reverse diffusion rate for light gases and a relatively low reverse diffusion rate for heavy gases. The first vacuum pumping means has a pump inlet coupled to the inlet of the gas analysis instrument. The apparatus further includes a cold trap coupled between the test port and a foreline, or outlet port, of the first vacuum pumping means. The cold trap condenses contaminants, water vapor and other gases from the gas sample. The trace gas passes in reverse direction through the first vacuum pumping means and is measured by the gas analysis instrument. A second vacuum pumping means is operative in combination with the cold trap to provide a prescribed operating pressure at the foreline during a leak test. The counterflow leak test apparatus incorporating a cold trap provides the capability to leak test at relatively high pressures. It further provides capability to prevent backstreaming of oil from mechanical vacuum pumps into a test piece, to rapidly perform leak testing of large, leaky or contaminated pieces and to test such pieces under high humidity conditions.

BRIEF DESCRIPTION OF THE DRAWINGS

For a better understanding of the present invention, together with other and further objects, advantages and capabilities thereof, reference may be had to the accompanying drawings which are incorporated herein by reference and in which.

DETAILED DESCRIPTION OF THE INVENTION

Figure 1B:
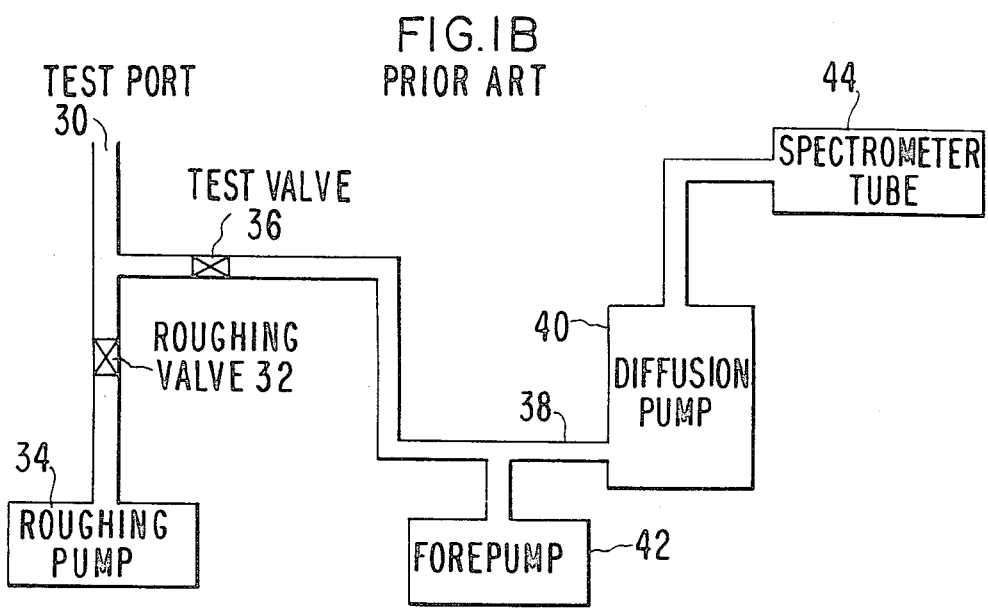
FIGS. 1A and 1B illustrate leak detection systems in accordance with the prior art.
Figure 1A:
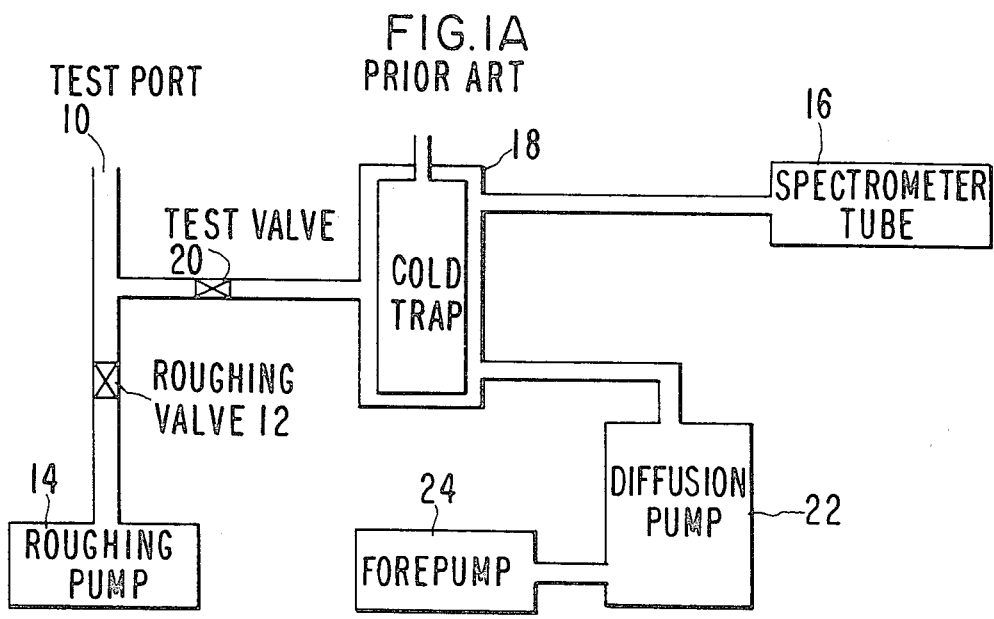

A conventional leak detection system is illustrated in FIG. 1A. A test port 10 is coupled through a roughing valve 12 to a roughing pumping 14 which performs an initial roughing, or vacuum, pumping of the test port 10. A test piece or sniffer probe (not shown) is coupled to the test port 10. A spectrometer tube 16 has an inlet coupled through a cold trap 18 and a test valve 20 to the test port 10. The cold trap 18 is also coupled to the inlet of a diffusion pump 22 which has its foreline pressure maintained by a forepump 24. In operation, the roughing pump 14 initially reduces the pressure at the test port 10 to approximately 15 millitorr. Test valve 20 is then opened. The cold trap 18, operating in combination with the diffusion pump 22, reduces the pressure at the test port 10 to the order of $2 \times 10^{-4}$ Torr, as required for operation of the spectrometer tube 16. The cold trap 18 removes water vapor and other condensable contaminants. However, the low test pressure cannot be achieved in the case of high gas load test pieces; and leak testing has been impossible.

A counterflow leak detector, in accordance with the prior art, is illustrated schematically in FIG. 1B. A test port 30 is coupled through a roughing valve 32 to a roughing pump 34. The test port 30 is also coupled through a test valve 36 to the foreline 38 of a diffusion pump 40. The foreline 38 is also coupled to a forepump 42 which maintains the required operating pressure at the foreline 38. The inlet to the diffusion pump 40 is coupled to the inlet of a spectrometer tube 44. In operation, the roughing pump 34 initially evacuates the test port 30 and the test piece (or sniffer probe) to a pressure in the range of 100 to 300 millitorr. The test valve 36 is then opened, and the helium tracer gas drawn in through the test port 30 diffuses in reverse direction through the diffusion pump 40 to the spectrometer tube 44. Since the diffusion pump 40 has a much lower reverse diffusion rate for the heavier gases in the sample, it blocks these gases from the spectrometer tube 44, thereby efficiently separating the tracer gas. The configuration of FIG. 1B has a much higher test pressure than the configuration of FIG. 1A, thereby facilitating vacuum pumping. Furthermore, leak testing of high gas load test pieces is efficiently accomplished. However, backstreaming of oil, testing of contaminated parts and testing under high humidity conditions have occasionally been problems with systems of the type shown in FIG. 1B.

Figure 2:
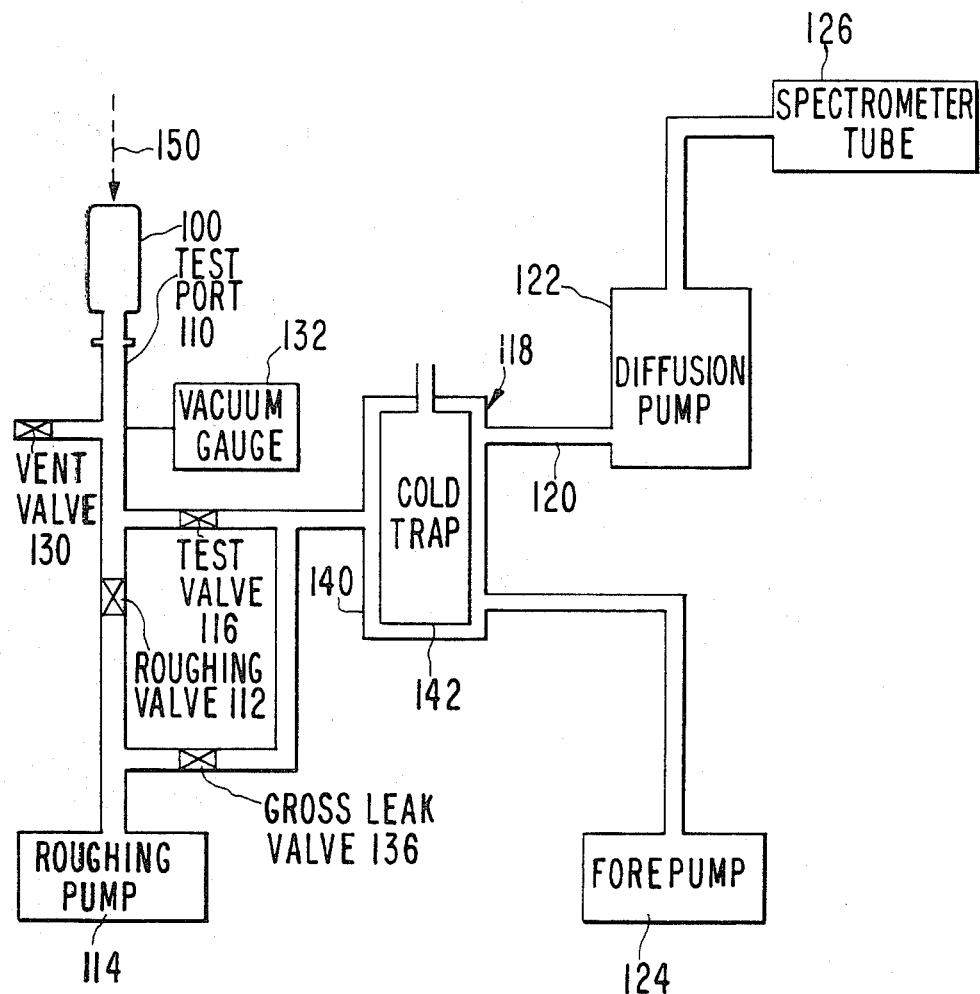
FIG. 2 is a schematic diagram of a leak detection system in accordance with the present invention.

A leak detection system, in accordance with the present invention, is shown in schematic form in FIG. 2. A test piece, shown at 100, or a sniffer probe (not shown), is coupled vacuum-tight to a test port 110. The test port 110 is coupled through a roughing valve 112 to a roughing pump 114. The various elements shown in FIG. 2 are coupled by suitable gas-tight connection such as $1\frac{1}{8}$ inch O.D. tubing. The test port 110 is also coupled through a test valve 116 to an inlet of a cold trap 118. The outlet of the cold trap 118 is coupled to the foreline 120 of a diffusion pump 122. A forepump 124 is coupled to another port of the cold trap 118 and is in gas communication with the foreline 120 of the diffusion pump 122. An inlet of the diffusion pump 122 is coupled to an inlet of a spectrometer tube 126. A vent valve 130 and a vacuum gauge 132 are coupled to the test port 110. A gross leak valve 136 is coupled between the cold trap side of the test valve 116 and the roughing pump 114.

The cold trap 118 is a refrigeration system which condenses on a cooled surface vapors drawn into the leak detection system from the test piece 100 or from the ambient atmosphere at the inlet to a sniffer probe. The cold trap 118 typically includes a cylindrical outer shell 140 and a smaller diameter inner shell 142 positioned within the outer shell 140. In a typical configuration, the outer shell 140 can have a diameter of about 5 inches, and the inner shell 142 can be spaced about one-half inch from the outer shell 140. The trace gas and other gases flowing between the test port 110 and the diffusion pump 122 circulate through the space between the outer shell 140 and the inner shell 142. A refrigerant material, such as liquid nitrogen, is introduced into the volume of the inner shell 142. Thus, gases passing through the cold trap 118 are condensed on the outer surface of the inner shell 142. Helium, due to its extremely low boiling point, is not condensed. The cold trap can have other physical configurations and can utilize other refrigerant materials. Such systems operate by providing a cold surface against which vapors condense. For example, the cold trap can employ a mechanical refrigerator with cooling coils placed in contact with the inner shell 142. Alternatively, a commercially available cryogenic pump can be utilized.

In a preferred embodiment, the roughing pump 114 and the forepump 124 each have pumping capacities of 7 cubic feet/minute. Pumps of larger capacity can be provided if necessary in a particular application. The diffusion pump 122 and the spectrometer tube 126 are similar to the units used in the Model 938-41 Leak Detector manufactured by Varian Lexington Vacuum Division. The characteristic which permits diffusion pumps to be used in reverse, or counterflow, operation for leak detection is differential reverse diffusion rates for heavy gases and light gases. That is, some fraction of the light gases including helium pass through the pump in reverse direction while a much smaller fraction of the heavy gases pass through the pump in reverse direction. The use of a diffusion pump in counterflow operation is described in U.S. Pat. No. 3,690,151 and by Worthington in "New Developments in Trapless Leak Detection," *Vacuum Technology Research/Development*, November 1976. Other high vacuum pumps have the required differential diffusion rate characteristic and are suitable for use in the counterflow leak detector of the present invention.

In operation, the test piece 100 or a sniffer probe is attached to the test port 110. The test piece 100 may have one or more leaks which are to be detected by the system of FIG. 2. Initially, the test valve 116, the gross leak valve 136 and the vent valve 130 are closed and the roughing valve 112 is opened, thereby permitting roughing of the test piece 100 (or the sniffer probe line)

and the test port 110 to a pressure of approximately 100 to 300 millitorr. When this pressure is reached, the roughing valve 112 is closed, and the test valve 116 is opened. The opening and closing of the valves can be controlled manually, such as from an operator console, or can be controlled automatically by either a microprocessor control system or an electrical control system which receives inputs from the vacuum gauge 132. When the test valve 116 is open, the cold trap 118 and the forepump 124 are operative in combination to maintain the pressure of the test piece 100 or sniffer probe, the test port 110 and the foreline 120 of the diffusion pump 122 at a pressure on the order of 100 to 300 millitorr; and leak testing can proceed. The tracer gas, helium, is introduced onto the outer surface of the test piece 100, such as by a helium spray, as indicated schematically at 150 in FIG. 2. Alternatively, if the test piece is pressurized with helium, then the sniffer probe is moved around the outside of the test piece. The helium is drawn through leaks into the interior of the test piece 100 or is drawn into the sniffer probe, and passes into the leak detection system through the test port 110. The helium then passes through the cold trap 118 and into the diffusion pump foreline 120. As is known in the art, the helium, because of its light weight, diffuses in a reverse direction through the diffusion pump 122 to the spectrometer tube 126. The spectrometer tube 126 is tuned to detect and measure helium and to provide an output signal which is proportional to the quantity of helium in the gas sample received from the test piece 100 or sniffer probe. The helium concentration is proportional to the leak rate of the test piece 100. While the diffusion pump 122 passes only a specified fraction of the helium to the spectrometer tube 126, a sufficient quantity reaches the spectrometer tube 126 to permit a highly accurate reading of leak rate. After leak testing is complete, the test valve 116 is closed; and the vent valve 130 is opened to vent the test piece 100 to atmosphere and permit its removal. When a sniffer probe is used, the helium pressure is removed from the test piece and the sniffer probe remains connected to the test port 110.

The gross leak valve 136 provides the capability to leak test pieces with very high leak rates. When a gross leak test is performed, the test valve 116 and the gross leak valve 136 are initially closed, and the roughing valve 112 is open to permit rough pumping of the test piece or sniffer probe line and the test port. Then the roughing valve 112 remains open, the test valve 116 remains closed and the gross leak valve 136 is opened in order to conduct a leak test. The roughing pump 114 is connected to the test port 110 and assists in maintaining the required test pressure.

Figure 3:
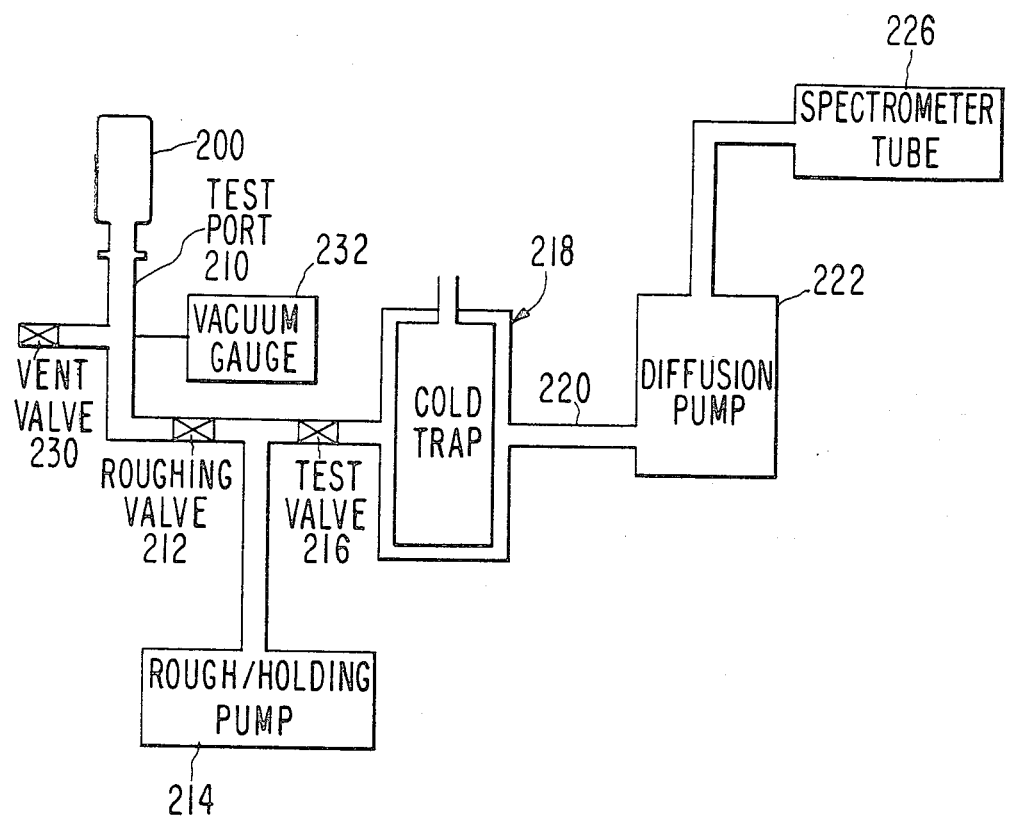
FIG. 3 is a schematic diagram of another embodiment of a leak detection system in accordance with the present invention.

Another preferred embodiment of the present invention is illustrated in schematic form in FIG. 3. The leak detector of FIG. 3 differs from the leak detector shown in FIG. 2 and described hereinabove principally in that one mechanical pump is utilized to perform both the roughing and holding functions. A test piece 200, or a sniffer probe, is coupled vacuum-tight to a test port 210. The test port 210 is coupled through a roughing valve 212 and a test valve 216, which are series-connected, to an inlet of a cold trap 218. The junction of the roughing valve 212 and the test valve 216 is coupled to a rough/holding pump 214. The outlet of the cold trap 218 is coupled to the foreline 220 of a diffusion pump 222. An inlet of the diffusion pump 222 is coupled to an inlet of a spectrometer tube 226. A vent valve 230 and a vacuum gauge 232 are coupled to the test port 210.

The elements of the leak detector shown in FIG. 3, such as the spectrometer tube 226, the diffusion pump 222 and the cold trap 218, correspond to the same elements shown in FIG. 2 and described hereinabove. The rough/holding pump 214 can be a mechanical pump, typically having a capacity of 7 cubic feet/minute.

In operation, the test piece 200 or a sniffer probe is attached to the test port 210. Initially, the test valve 216 and the vent valve 230 are closed and the roughing valve 212 is opened, thereby permitting roughing of the test piece 200 (or the sniffer probe) and the test port 210 by the rough/holding pump 214. When a pressure of approximately 100 to 300 millitorr is reached, the test valve 216 is opened; and leak testing can proceed as described hereinabove in connection with FIG. 2. During the test cycle, the rough/holding pump 215 maintains the line between the test port 210 and the foreline 220 of the diffusion pump 222 at the required test pressure. Therefore, the rough/holding pump 214 is operative during both the roughing and test cycles; and the forepump 124 shown in FIG. 2 is eliminated. The use of the cold trap 218 in the leak detector of FIG. 3 provides the same advantages and improvements in operation as described hereinabove in connection with FIG. 2.

It will be understood that the leak detection system receives not only the tracer gas helium from the test piece or the sniffer probe, but also gases from the atmosphere, water vapor and other contaminants. In accordance with the present invention, the cold trap is operative to condense contaminants, water vapor and gases other than helium and improve operation of the system. The cold trap is particularly useful under several leak detection conditions. When large volume pieces are being tested, pumping to the required level can be difficult due to outgassing of the relatively large surface areas of the piece. Pumping can also be difficult in the case of test pieces which are particularly leaky. It is often necessary to test parts which have surfaces contaminated with volatile compounds, such as oil or water vapor, which outgas continuously during leak testing. Any of the above situations can be made worse if the ambient environment is particularly humid, thereby introducing large quantities of water vapor into the leak detection system. In any of these circumstances, maintaining the required test pressure has heretofore been difficult. Furthermore, it is desirable to improve productivity of the leak detection system by reducing the test time as much as possible. The test time can, in part, be improved by reducing the time for pumping of the test piece. The counterflow leak detector with cold trap in accordance with the present invention provides the ability to test at relatively high pressures and also provides the capability to test large or contaminated pieces very rapidly, even under extremely humid conditions. A further advantage of the cold trap relates to backstreaming of oil from the forepump during a leak test. The cold trap condenses oil vapors from the forepump and prevents them from reaching and contaminating the test piece.

A test piece comprising an 11 liter plasma etching chamber containing plastic (which is subject to outgassing) and blind tapped holes was tested with a conventional leak detector (FIG. 1A), a counterflow leak detector (FIG. 1B) and a leak detector in accordance with the present invention (FIG. 2). The conventional leak detector was unable to reach a sufficiently low pressure to transfer to the spectrometer tube. The counterflow leak detector reached $1\times10^{-9}$ atm. cc/sec. detection sensitivity level in 3.25 minutes. The leak detector, in accordance with the present invention, reached $1\times10^{-9}$ atm. cc/sec. detection sensitivity level in 2.5 minutes.

While there has been shown and described what is at present considered the preferred embodiments of the invention, it will be obvious to those skilled in the art that various changes and modifications may be made therein without departing from the scope of the invention as defined by the appended claims.

We claim:

1. Apparatus for leak detection comprising:
   a test port adapted for receiving a trace gas;
   a gas analysis instrument tuned to detect said trace gas and having an inlet for receiving said trace gas;
   first vacuum pumping means characterized by a relatively high reverse diffusion rate for light gases and a relatively low reverse diffusion rate for heavy gases, said first vacuum pumping means having a pump inlet and a foreline, said pump inlet being coupled to said inlet of said gas analysis instrument;
   a cold trap coupled in series between said test port and said foreline of said first vacuum pumping means; and
   second vacuum pumping means operative in combination with said cold trap for providing a prescribed operating pressure at said foreline during a leak test.

2. The apparatus as defined in claim 1 wherein said second vacuum pumping means includes
   roughing pump means for evacuating said test port during an initial roughing cycle in preparation for said leak test and
   a test valve for isolating said test port from said cold trap, said first vacuum pumping means and said gas analysis instrument during said roughing cycle.

3. The apparatus as defined in claim 2 wherein said second vacuum pumping means further includes a foreline pump which, in combination with said cold trap, maintains the pressure of said foreline at or below said operating pressure during said leak test and wherein said test valve is coupled to said test port.

4. The apparatus as defined in claims 2 or 3 wherein said roughing pump means includes a roughing valve coupled to said test port and a roughing vacuum pump coupled through said roughing valve to said test port.

5. The apparatus as defined in claims 1, 2 or 3 wherein said first vacuum pumping means includes a diffusion pump.

6. The apparatus as defined in claims 1, 2 or 3 wherein said gas analysis instrument includes a mass spectrometer tube.

7. The apparatus as defined in claim 1 wherein said cold trap contains liquid nitrogen coolant.

8. The apparatus as defined in claim 1 wherein said cold trap includes mechanical refrigeration means.

9. Apparatus for leak detection comprising:
   a test port adapted for receiving a trace gas from a unit being tested;
   a mass spectrometer tuned to detect said trace gas having an inlet for receiving said trace gas;
   a diffusion pump having a pump inlet and a foreline, said pump inlet being coupled to said inlet of said mass spectrometer;
   a cold trap coupled in series between said test port and said foreline of said diffusion pump;
   means for evacuating said test port during an initial roughing cycle in preparation for a test cycle;
   a vacuum pump which, in combination with said cold trap, maintains the pressure of said foreline at or below a prescribed operating pressure during said test cycle; and
   a test valve for isolating said test port from said cold trap, said diffusion pump and said mass spectrometer during said roughing cycle.

10. The apparatus as defined in claim 9 wherein said means for evacuating said test port includes a roughing pump coupled to said test port through a roughing valve which is open during said roughing cycle.

11. The apparatus as defined in claim 9 wherein said vacuum pump is coupled to said cold trap.

12. The apparatus as defined in claim 9 wherein said cold trap contains liquid nitrogen.

13. The apparatus as defined in claim 9 wherein said cold trap includes mechanical refrigeration means.

14. The apparatus as defined in claim 10 wherein a gross leak conduit is connected to the coupling between said roughing valve and said roughing pump and is also connected to the coupling between said test valve and said cold trap, and a gross leak valve is positioned along said gross leak conduit.

15. Apparatus for leak detection comprising:
    a test port adapted for receiving a test sample including a trace gas;
    a gas analysis instrument tuned to detect said trace gas and having an inlet for receiving said trace gas;
    first vacuum pumping means characterized by a relatively high reverse diffusion rate for light gases in said test sample and a relatively low reverse diffusion rate for heavy gases in said test sample, said first vacuum pumping means including a pump inlet and a foreline, said pump inlet being coupled to said inlet of said gas analysis instrument;
    a cold trap;
    conduit means for conducting said test sample from said test port, to said cold trap and then to said foreline of said first vacuum pumping means;
    said cold trap being isolated from communication with said gas analysis instrument except in the sense that the cold trap is connected to the foreline of said first pumping means and the inlet of said first pumping means is connected to said gas analysis instrument;
    second vacuum pumping means for evacuation of said apparatus in preparation for a leak test; and
    said second pumping means having its inlet connected to said conduit means between said test port and said cold trap.

* * * * *